Oct. 27, 1931.  J. ROTHSCHILD  1,829,372
AIRPLANE
Filed May 29, 1929
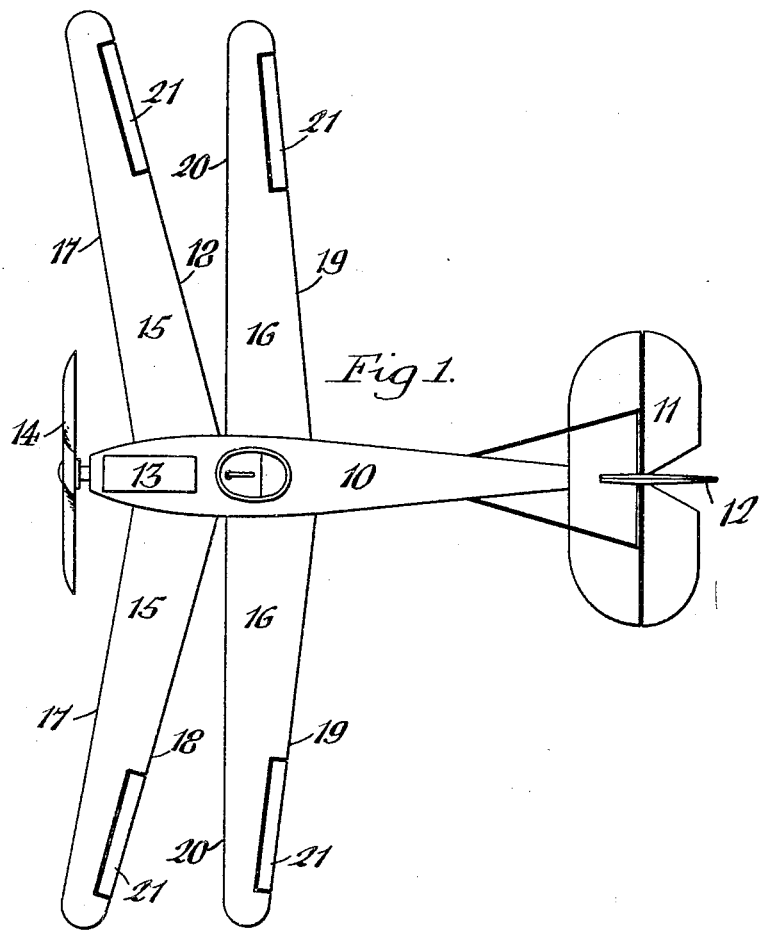
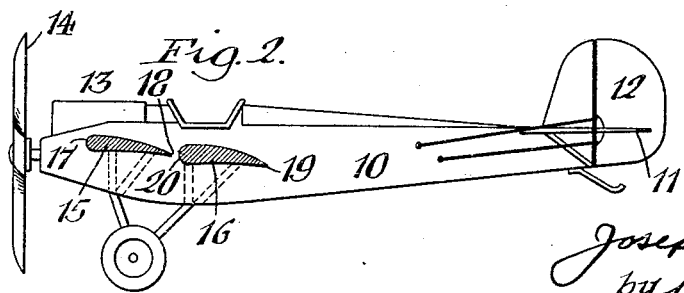
Inventor,
Joseph Rothschild,
by Walter P. Geyer
Attorney.

Patented Oct. 27, 1931

1,829,372

UNITED STATES PATENT OFFICE

JOSEPH ROTHSCHILD, OF BUFFALO, NEW YORK

AIRPLANE

Application filed May 29, 1929. Serial No. 366,845.

This invention relates to improvements in aircraft, particularly airplanes.

Its principal object is to so improve the structural arrangement of the wings and ailerons of the machine that greater safety and stability in flying is obtained and a minimum of speed is required for taking off and for landing.

A further object of the invention is to so arrange the ailerons of the plane as to reduce to a minimum the possibility of side-slipping as well as tail-spinning.

In the accompanying drawings:

Figure 1 is a top plan view of an airplane constructed in accordance with my invention. Figure 2 is a side view thereof, partly in section.

Similar characters of reference indicate corresponding parts throughout the several views.

While my invention is applicable to various types and designs of airplanes, it has been shown, by way of example, in connection with a monoplane, 10 indicating its body or fuselage, 11 and 12 the horizontal and vertical rudders, respectively, for controlling the elevation and direction of the plane, 13 the motor and 14 the propeller. The construction of this much of the plane may be in accordance with standard practise.

Projecting laterally from opposite sides of the fuselage 10 are two sets of wings 15, 16 which may be positioned adjacent to the front end of the fuselage in proximity to the motor. The wings 15, 16 of each set are disposed side by side in substantially the same horizontal plane and the corresponding wings of each set are arranged opposite each other to balance the plane. Said wings are preferably positioned at an angle to each other, the front or leading wings 15 being dihedrally arranged and forming an acute angle with the companion rear wings 16 and the opposing inner edges of the respective wings practically meeting or intersecting adjacent to the fuselage. As shown in Figure 1, the front wings preferably converge rearwardly, their leading edges 17 forming an acute angle with the longitudinal axis of the fuselage and their trailing edges 18 forming an obtuse angle with such axis. The rear wings may be disposed approximately at right angles to the fuselage-axis with their trailing edges 19 extending in the same general direction as the corresponding edges of the front wings, while their leading edges 20 are substantially at right angles to said axis.

The wings may be of any appropriate length depending on the character of the service for which the plane is designed. The preferred cross-section or profile of the two sets of wings are shown in Figure 2, the leading wings 15 being comparatively thin and of stream-line formation and the rear wings being likewise stream-lined, but somewhat thicker with a more sharply defined crowned top surface than the leading wings. In other words, the wings are successively increased in thickness and of a higher camber to obtain a greater lift.

When an airplane equipped with my wings is in flight, the air flows past the underside and upper surface of the leading wings 15 in an even path, following the stream-like profile of those wings and creating a vacuum above the surface thereof. After leaving the tail edges of the leading wings, the air strikes the thickened leading edges of the rear wings 16 at a small angle, which results in a greater vacuum being produced on the last-named wings. This wing arrangement provides for an effective use of the left stream affords increased stability and safer flying and makes possible a slower speed for landing and alighting.

For the purpose of reducing to a minimum the possibility of side-slipping or tail-spinning the front and rear sets of wings 15, 16 are equipped with ailerons 21 which are disposed at relatively different angles. The ailerons on the leading wings are disposed at a smaller angle to the axis of the fuselage than are the ailerons on the rear wings which are disposed at a greater angle thereto. As shown in Figure 1, these ailerons follow the general direction of the rear edges of the companion wings and act against one another to prevent the plane from going into a tail spin or a side slip.

I claim as my invention:—

1. An airplane, comprising a fuselage, and front and rear wings disposed laterally of the fuselage in edgewise relation and at different angles to the longitudinal axis of the fuselage, the rear wings being of a higher camber than the front wings.

2. An airplane, comprising a fuselage, a front set of wings, and a rear set of wings disposed in the plane of and in edgewise alining relation to said front set, the companion wings on each side of the fuselage diverging outwardly relatively to each other laterally of said fuselage and the rear set of wings being of a higher camber than the front wings.

3. An airplane, comprising a fuselage, a front set of wings extending laterally from said fuselage with their leading edges converging rearwardly from their outer to their inner ends and a rear set of wings of a higher camber than the front set of wings disposed in edgewise relation to and with their leading edges arranged at a greater angle to the fuselage than said front set of wings.

4. An airplane, comprising a fuselage, two sets of wings disposed one behind the other in contiguous relation and projecting laterally from opposite sides of the fuselage, said wings being disposed in substantially the same horizontal plane and the rear set of wings being thicker in cross-section and of a higher camber than the front set of wings.

5. An airplane, comprising a fuselage, a front set of wings extending laterally from said fuselage with their leading edges converging rearwardly from their tip ends to their inner ends, and a rear set of wings disposed in substantially horizontal edgewise relation to the front set of wings with their leading edges disposed at substantially right angles to the center line of the fuselage.

6. An airplane, comprising a fuselage, two sets of wings disposed one behind the other in contiguous relation and projecting laterally from opposite sides of the fuselage, said wings being disposed in substantially the same horizontal plane and the rear set of wings being thicker in cross-section and of a higher camber than the front set of wings, and ailerons applied to the wings and disposed at different angles to the longitudinal axis of the fuselage.

JOSEPH ROTHSCHILD.